United States Patent [19]
Eichenlaub

[11] Patent Number: 6,157,424
[45] Date of Patent: Dec. 5, 2000

[54] 2D/3D IMAGING DISPLAY

[75] Inventor: Jesse B. Eichenlaub, Penfield, N.Y.

[73] Assignee: Dimension Technologies, Inc., Rochester, N.Y.

[21] Appl. No.: 09/050,440

[22] Filed: Mar. 30, 1998

[51] Int. Cl.[7] .............................................. G02F 1/1347
[52] U.S. Cl. .................................. 349/74; 349/77; 349/83
[58] Field of Search ................................... 349/15, 74, 77, 349/83; 348/52, 59, 751, 752, 761, 762, 766, 767; 359/463, 464, 465, 894

[56] References Cited

U.S. PATENT DOCUMENTS

| | | |
|---|---|---|
| 4,367,486 | 1/1983 | Eichenlaub .................................. 358/88 |
| 4,717,949 | 1/1988 | Eichenlaub .................................. 358/3 |
| 4,829,365 | 5/1989 | Eichenlaub .................................. 358/3 |
| 5,036,385 | 7/1991 | Eichenlaub .................................. 358/3 |
| 5,040,878 | 8/1991 | Eichenlaub .............................. 350/345 |
| 5,311,220 | 5/1994 | Eichenlaub ............................... 348/55 |
| 5,349,379 | 9/1994 | Eichenlaub ............................... 348/59 |
| 5,410,345 | 4/1995 | Eichenlaub ............................... 348/59 |
| 5,428,366 | 6/1995 | Eichenlaub ............................. 345/102 |
| 5,457,574 | 10/1995 | Eichenlaub ............................. 359/619 |
| 5,500,765 | 3/1996 | Eichenlaub .............................. 359/463 |
| 5,696,552 | 12/1997 | Aritake et al. ............................. 348/51 |
| 5,831,765 | 11/1998 | Nakayama et al. ..................... 359/464 |

*Primary Examiner*—James A. Dudek
*Attorney, Agent, or Firm*—Stephen B. Salai, Esq.; Brian B. Shaw, Esq.; Harter, Secrest & Emery

[57] ABSTRACT

An improved 2D/3D display is disclosed. In one embodiment, the display uses both an imaging LCD and a secondary LCD. The secondary LCD is a light line forming LCD which can be placed between a light line forming system and the imaging LCD for eliminating ghost images, or can be used as the light line forming system itself. Variations of a glass sandwich employing an imaging liquid crystal layer and a line forming liquid crystal layer are disclosed. Alternatively, the secondary LCD may comprise a liquid crystal layer and a series of polarizing strips. Displays in which a 2D or 3D window can be viewed within a 3D or 2D window, respectively, are disclosed using light line forming systems and alternatively using light line forming LCD's which have the opaque stripes divided into individually controllable areas. Movement of one window within another window is disclosed. Also disclosed is a strip diffuser for improving visual characteristics in 3D mode and movable elements for alternating between 2D and 3D mode.

23 Claims, 7 Drawing Sheets

2D/3D IMAGING DISPLAY

This invention was developed with U.S. Government support under contract number 2R44N534248-2 awarded by National Institutes of Health, and the United States Government may have certain rights in this invention.

FIELD OF THE INVENTION

The present invention relates to a 2D/3D display with enhanced characteristics and to a display which improves the appearance of images in 3D mode.

BACKGROUND OF THE INVENTION

Various devices and structures for generating an array of thin, vertical, parallel, equidistant, light emitting lines behind a flat, transmissive, electronically controlled display panel, such as a liquid crystal display (LCD), to generate for an observer a perception of three dimensional images are disclosed in U.S. Pat. Nos. 4,717,949, 4,829,365, 5,036,385, 5,040,878, and 5,457,574 and U.S. patent application No. 08/674,468. These-references describe various devices for generating an array of thin lightlines as the means for creating stereoscopic images.

There are many areas for improvement in the prior art. For instance, there continues to be a need for a simple means of forming and viewing stereoscopic images, which is less expensive to produce, and which can utilize combinations of previously developed elements. There is further a need for a display which can provide a system with the capability of switching back and forth from 2D to 3D images and a need for alternate methods of switching between 2D and 3D viewing. There is further a need for a display which can use standard backlighting resources while reducing the number of additional layers necessary to create 2D/3D images. There is further a need for the ability to move a 2D window within a 3D window and a 3D window within a 2D window. There is further a need for a display which eliminates ghost images which occur in 3D viewing. There is further a need for a display which reduces the visibility of moiré patterns in 3D viewing and improves the appearance of 3D images when a viewer moves within a viewing area.

SUMMARY OF THE INVENTION

Thus, it is an object of the present invention to provide a 2D/3D display using a secondary LCD to eliminate ghost images in 3D viewing.

It is another object of the present invention to provide a secondary LCD in a 2D/3D display to create the lines of light necessary for 3D viewing.

It is another object of the present invention to provide a super thin 2D/3D display using a barrier mask to display the lines of light necessary for 3D viewing in combination with a diffuser for diffusing the lines of light for 2D viewing.

It is another object of the present invention to provide a 2D/3D display capable of moving a 2D window within a 3D window or a 3D window within a 2D window.

It is a further object of the present invention to provide a glass sandwich of liquid crystal layers and polarizers to create a single element capable of imaging lines of light.

It is a further object of the present invention to provide a movable element to switch a 2D/3D display from 2D to 3D viewing.

It is yet another object of the present invention to provide a strip diffuser in an autostereoscopic display to reduce the visibility of moiré patterns in 3D viewing.

Other objects will in part be obvious and in part appear hereinafter.

In a preferred embodiment of the present invention, a 2D/3D display comprises an image forming LCD and a secondary LCD being clear or uniformly transmissive in 2D mode, and displaying thin transparent lines separated by dark opaque stripes in 3D mode. The 2D and 3D modes may cover the entire device, or a selectable, movable portion of the device. The display may comprise, in addition, a light line forming device, the transparent lines of the secondary LCD being coincident with light lines from the light line forming device, wherein the dark opaque stripes of the secondary LCD block stray light that can cause ghost images. Alternatively, the 2D/3D display may further comprise a diffuse light source behind the secondary LCD, so that the thin transparent lines of the secondary LCD form the light lines for creating viewing zones for 3D viewing.

The image forming LCD and the secondary LCD may together comprise a "glass sandwich" which can simplify manufacturing and permit a high degree of automation. The image forming LCD may comprise a rear layer of glass and a front layer of glass divided by an image forming liquid crystal layer with a front polarizer on the front layer of glass and a rear polarizer on the rear layer of glass. The secondary LCD may comprise a front layer of glass and a rear layer of glass divided by a light line forming liquid crystal layer wherein the rear layer of glass in the secondary LCD is attached to a rear polarizer and the front layer of glass is attached to the rear polarizer of the image forming LCD.

Alternatively, the "glass sandwich" may comprise the image forming LCD having an image forming liquid crystal layer, a front thin polarizing layer and a front layer of glass and the secondary LCD having a front thin polarizing layer, a front layer of glass, a light line forming liquid crystal layer, a rear thin polarizing layer and a rear layer of glass.

The secondary LCD, in another embodiment, may include a liquid crystal layer and a series of polarizing strips having clear spaces in between the polarizing strips, the strips and liquid crystal layer separated by a layer of glass, wherein a position of molecules within the liquid crystal layer can be changed, upon application of a voltage, to be perpendicular to a polarization direction of the polarizing strips. In such an embodiment, the image forming LCD would have a rear polarizer with a polarization direction being parallel with a polarization direction of the polarization strips, such that the polarization strips appear opaque upon application of the voltage, forming the dark opaque stripes for 3D mode.

In a preferred embodiment, at least some of the dark opaque stripes in the secondary LCD have individually controllable sections wherein a 2D imaging area can be viewed within a larger 3D imaging area by turning the controllable sections of the opaque stripes within a subspatial rectangular area on the secondary LCD clear while the opaque stripes outside the rectangular area remain dark. Conversely, a 3D imaging area can be viewed within a larger 2D imaging area by turning the controllable sections of the opaque stripes outside a subspatial rectangular area on the secondary LCD clear while the opaque stripes within the rectangular area remain dark. The display would include software for generating coordinates of corners of the rectangular area, a controller for translating information from the software, and line drivers for receiving signals from the controller to make the secondary LCD go clear everywhere except within the rectangular area for a 3D window within a 2D window or clear outside the rectangular area for a 2D window within a 3D window.

Instead of a secondary LCD, a 2D/3D display according to another embodiment of the present invention may utilize a barrier mask having opaque stripes separated by clear transparent spaces and a variable diffuser capable of being changed from transparent for 3D mode to diffuse for 2D mode. The variable diffuser would be positioned between an image forming LCD and the barrier mask, and the barrier mask would be positioned between a backlight and the variable diffuser. Preferably, the diffuser is a multi-element diffuser with elements in the diffuser being independently controllable and capable of becoming diffuse or transparent. By using a multi-element diffuser, a selected window on the display may be viewed in one of 2D or 3D mode while a remainder of the display outside the selected window may be viewed in either 2D or 3D mode by turning elements within the selected window transparent for 3D mode and diffuse for 2D mode and elements outside the selected window transparent for 3D mode and diffuse for 2D mode. As in previous embodiments, software may be included in the display for generating coordinates of the selected window, so that the selected window is movable within the display. An advantage of this embodiment is the ability to manufacture a super thin 2D/3D display. The barrier mask may be a sheet having a thickness of 0.2 mm or less and the variable diffuser may be a layer having a thickness of 0.8 mm or less. The variable diffuser may be positioned within at least 0.5 mm of the barrier mask to diffuse the opaque stripes when in a diffuse state.

In another preferred embodiment, a 2D/3D display comprises a light line forming system and a movable element movable from a first position for 2D viewing to a second position for 3D viewing wherein the first position and second position define planes parallel to a plane of the display's image forming LCD. In one embodiment, the element is a diffuser. If 2D applications are used more often on the display, then the diffuser is preferably biased in the first position. The light line forming system of the display may comprise a source of light and a lenticular lens sheet with the movable diffuser positioned between the source of light and the lenticular lens sheet. Thus, the first position for 2D viewing would be adjacent the lenticular lens sheet and the second position for 3D viewing would be adjacent the source of light. The source of light may be a set of straight lamps and the display may further comprise an opaque light barrier occupying positions between the lamps. The moveable element may alternatively comprise elements of the light line forming system. The movement of the diffuser of other element from the first position to the second position may be activated by magnetic coils.

In another aspect of the present invention, a display having the ability to reduce the visibility of Moiré patterns outside ideal 3D viewing locations may comprise a diffuser having a plurality of thin strips of diffusing material separated by clear spaces. The display further comprises a light line forming system, wherein an ideal viewing plane exists where lines from the light lines through the pixel boundaries cross at a reasonable viewing distance from the display. The diffuser would then be positioned at a second plane where these lines cross each other, the second plane being located between the ideal viewing plane and the light line forming system. The display further would comprise an LCD positioned between the second plane and the light line forming system with the strips of the diffuser being vertical and parallel to pixel columns of the LCD, wherein the strips are wide enough to cover an area where light from the light line forming system exits the pixel columns, but narrow enough to stay outside dark areas where light is blacked by pixel boundaries. Preferably, the strips are lined up between points where lines between centers of the light lines from the light line forming system and centers of pixel boundaries from the LCD cross. Light hitting the diffuser is spread out to enter dark Moiré areas within the ideal viewing plane and fill these areas with light but the light preferably does not go beyond lines defined by light lines from the light line forming system and pixel columns from the LCD. Preferably, the strips are holographic diffusers with a well defined scattering pattern wherein the diffusers are very weak, typically scattering light less than 2 degrees.

The foregoing and other features and advantages of the invention will be more readily understood and fully appreciated from the following detailed description, taken in conjunction with the accompanying drawings.

DETAILED DESCRIPTION OF THE PREFERRED EMBODIMENTS

Figure 1:
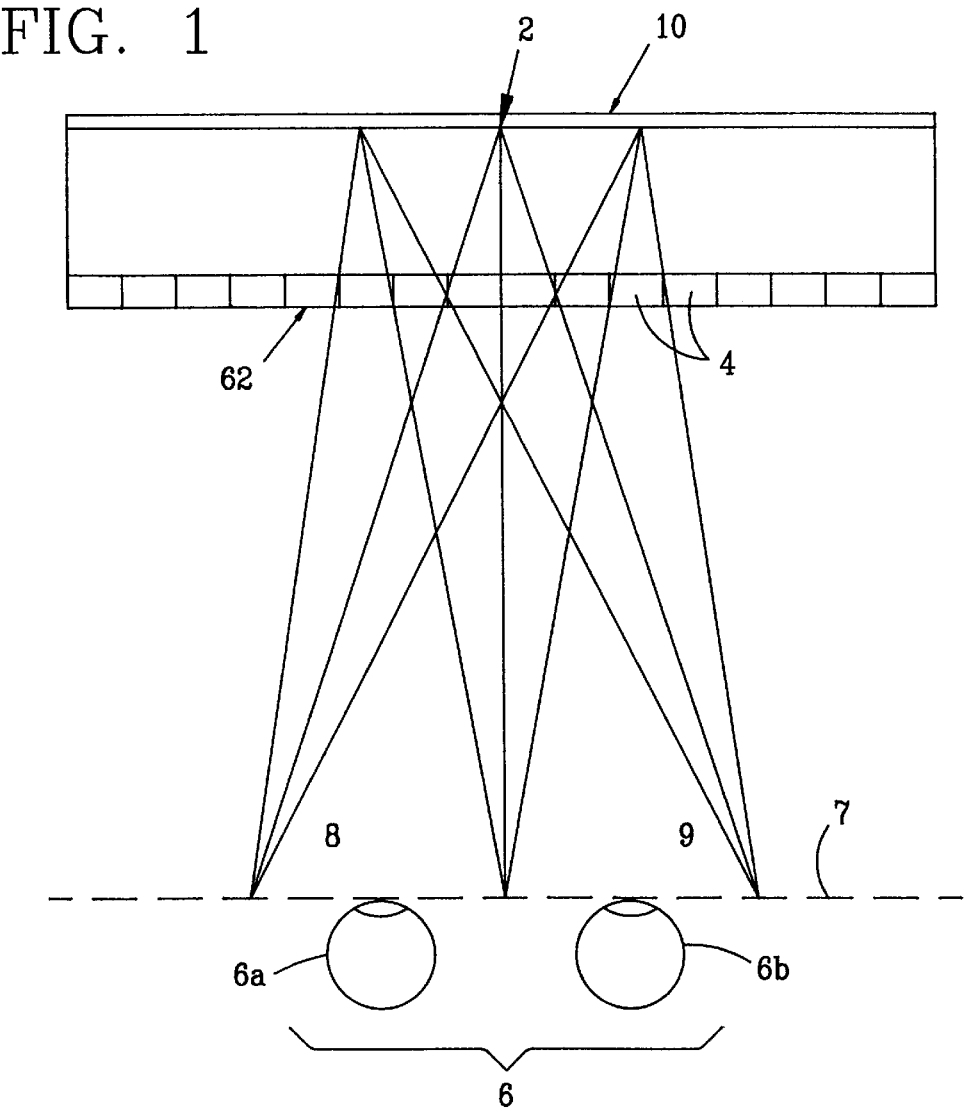
FIG. 1 shows a top view of an autostereoscopic display employing a light valve and vertical light emitting lines.

As described in U.S. patent application No. 08/674,468 and exemplified in FIG. 1, an autostereoscopic display is shown. A transmissive light valve display 62, such as a liquid crystal display (LCD), is situated in front of and spaced apart from an illuminating lightguide 10 which produces on a surface a large number of thin, bright, parallel vertical light lines 2. There is at least one light line 2 for every pair of pixel columns 4 in the transmissive display 62. The light lines 2 are spaced apart from each other and from the transmissive display 62 at such a distance that an observer 6 seated at some viewing distance directly in front of the transmissive display 62 screen, sees all of these lines through the odd numbered columns of pixels 4 with his or her left eye 6a and all of the lines through the even numbered columns of pixels 4 with his or her right eye 6b. Thus, the left eye 6a sees only what is displayed on the odd columns of pixels 4, and the right eye 6b sees only what is displayed on the even columns of pixels 4. If the left eye 6a view of a stereoscopic image pair is displayed on the odd columns and a right eye 6b view on the even columns, a stereoscopic image with apparent depth is perceived by the observer 6. The observer 6 will see the correct left eye 6a and right eye 6b images as long as his or her eyes are near an ideal viewing plane 7 and within certain viewing zones 8 and 9 whose boundaries are defined by lines running from the light lines 2 through the pixel column 4 boundaries, as shown in FIG. 1.

Figure 2:
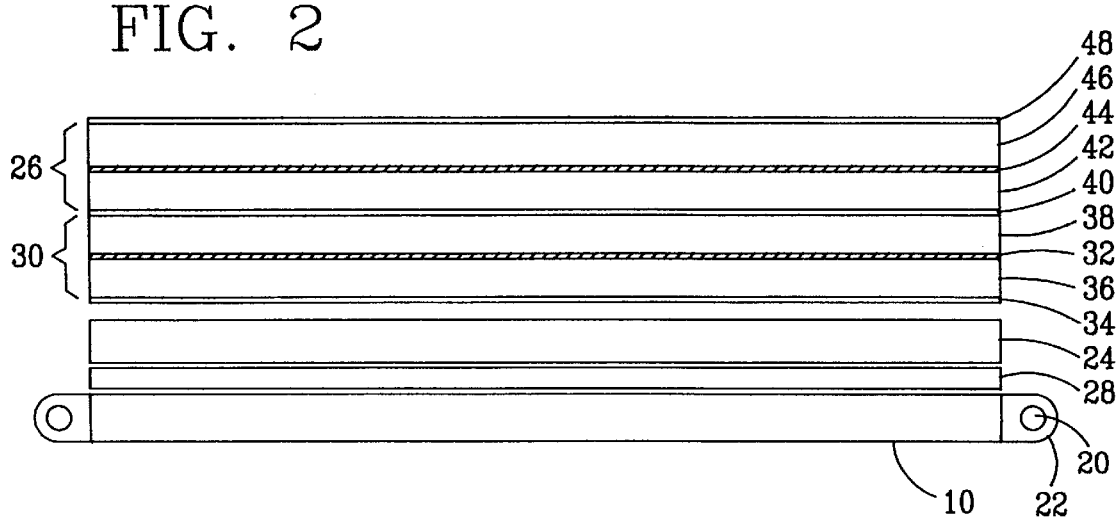
FIG. 2 shows a top view of one embodiment of the present invention using an image forming LCD, a planar backlighter and lenticular lens for forming light lines, a diffuser for alternating between 2D and 3D viewing, and a secondary LCD for eliminating ghost images.

As shown in FIG. 2, a light guide 10 with linear reflective structures on its rear surface, such as triangular ridges or white ink lines (as further described in U.S. patent application No. 08/674,468), is illuminated along one or more of its sides by fluorescent lamps or equivalent devices 20. Reflectors 22 directs the light from the lamps 20 into the light guide 10. A lenticular lens 24 images the lines of light formed by the reflective structures into many more, thinner lines spaced behind the pixel layer of an image forming LCD 26. These lines, together with the image forming LCD pixels, form viewing zones from which stereo pairs are visible.

An electronically variable diffuser 28 is placed between the lens 24 and the light guide 10. For three dimensional viewing it is caused to become clear, so that the linear structures on the rear of the light guide 10 can be seen from the area of the lenticular lens 24, and so are imaged into lines. It is also possible, in some cases, to place the variable diffuser 28 between the lenticular lens 24 and LCD 30, in a plane that is displaced from the plane where the light lines are focused. The displacement must be sufficient for the variable diffuser 28 to wash out the light lines in the diffuse state.

A secondary LCD 30 is placed with its LC layer 32 at or very near the plane where the lines are focused by the lenticular lenslets on lens 24. This LCD 30 can be made to display thin, transparent slits or lines with dark opaque areas or stripes between, and the transparent slits are positioned so as to be coincident with the light lines formed by the lenticular lens 24, allowing the light from the light lines to pass through. The dark areas between the slits serve to block stray light than can cause ghost images, otherwise referred to as cross talk.

For 2D operation, in which all the pixels of the image forming LCD 26 are to be made visible to both eyes, the opaque areas on the secondary LCD 30 are made to turn clear, while the areas between (i.e. the transparent slits) remain clear, causing the entire surface of this LCD 30 to become clear or uniformly transmissive. In addition, the variable diffuser 28 is caused to become translucent so that it scatters light, thus washing out or blurring the light from the linear structures on the light guide 10 behind it, and taking on the appearance of an evenly illuminated sheet. Since the light lines are now blurred into one another as seen from the lenticular lens 24, the lenslets no longer image light into lines at the secondary LCD 30 surface, but rather image it into a plane of evenly distributed light. Thus, even, diffuse light passes through the secondary LCD 30 and through the image forming LCD 26, eliminating the viewing zones, and allowing each eye of the observer to see all of the pixels on the LCD 26 for 2D viewing.

The advantage of this variation is that the secondary LCD 30 blocks most of the stray light that causes ghosting in the previous arrangement. A barrier mask made with transparent slits separated by black or dark opaque areas can be used instead of the secondary LCD 30, in situations where it is not necessary to remove or disable the opaque areas. Such an embodiment would also help eliminate ghosting. Alternate embodiments using such a barrier mask are described further below, with respect to FIG. 7.

The secondary LCD 30 can generally take the form shown in FIG. 2: A polarizer 34 is placed on its rear surface, followed by a sheet of glass 36, followed by the pixel layer itself 32, followed by another sheet of glass 38. No polarizer is needed on the front, since the rear polarizer 40 on the image forming LCD 26 can perform the function of both front polarizer for the secondary LCD 30 and rear polarizer 40 for the image forming LCD 26.

Figure 3:
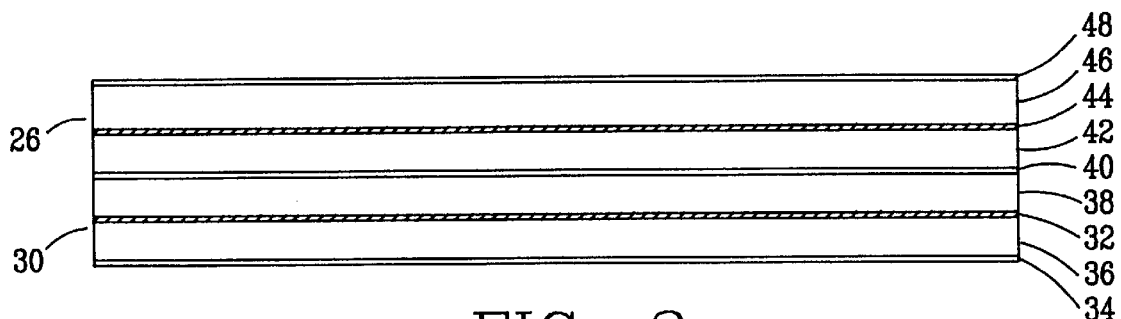
FIG. 3 shows a top view of an image forming LCD and a secondary LCD for forming lines of light and enabling 2D and 3D viewing.

An alternate configuration, which can be used under some circumstances when brightness in 3D mode can be less than that in 2D mode, is shown in FIG. 3. This alternate embodiment does without the lenticular lens 24 and PDLC diffuser 28 and uses the secondary LCD 30 itself to form lines of the correct size and position to form viewing zones. The special purpose line forming backlight 10 described in U.S. patent application No. 08/674,468 is replaced by a conventional diffuse backlight (not shown) placed behind the secondary LCD 30. The slits of the secondary LCD 30 by themselves become the light lines. For 2D operation, the entire secondary LCD 30 is turned clear, letting the diffuse light from the backlight pass through it evenly.

The LCD slit mask can be integrated into the imaging LCD to form, in effect, the rear glass component of the image forming LCD. Possible configurations are shown in FIGS. 3, 4, and 5.

In 3, the following configuration is used: A polarizer 34 is the rearmost layer. This is followed, (moving forward), by a piece of glass 36. The LC layer 32 and electronics forming the slits is placed next, followed by a second piece of glass 38, followed by a second polarizer 40, followed by the imaging LCD glass 42. This assembly could be offered for sale in place of the normal LCD glass. The next layer in the final assembly would be the imaging LCD pixel layer 44, and the imaging LCD glass 46, and finally the front polarizer 48.

Figure 4:
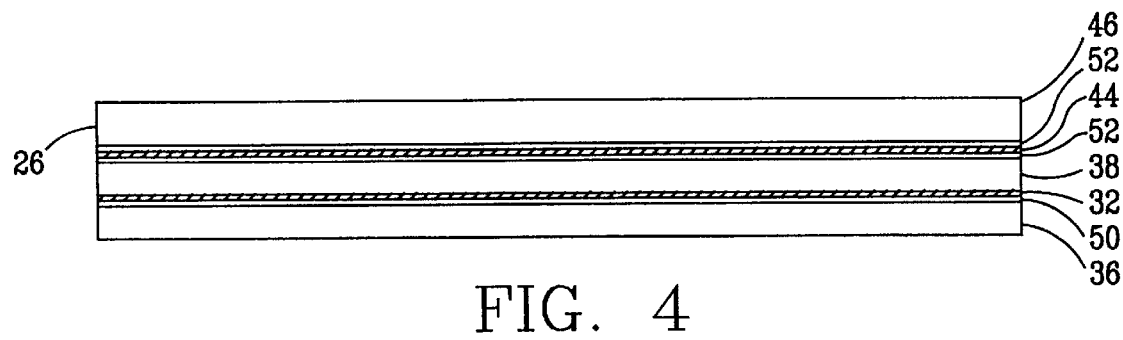
FIGS. 4 and 5 views of alternate embodiments of the configuration shown FIG. 3, these embodiments utilizing thin deposited polarizing materials which can be placed next to the liquid crystal layers.
Figure 5:
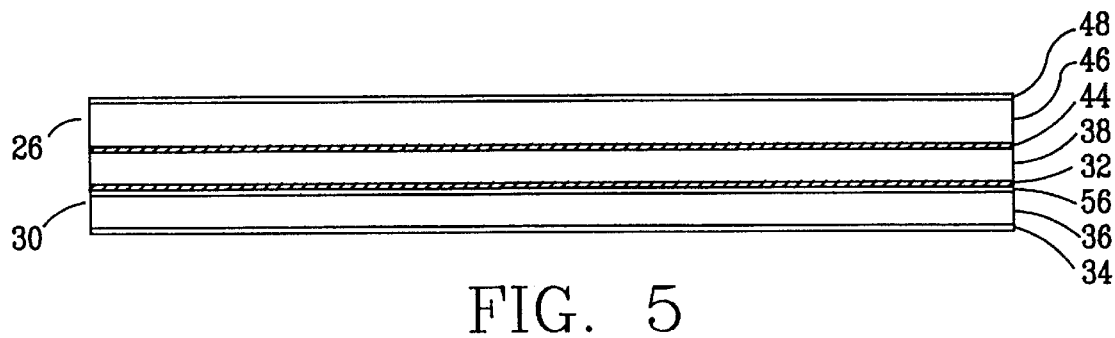

FIGS. 4 and 5 show variations of this embodiment that can make use of new thin deposited polarizing materials that can be placed next to the liquid crystal layers 32 and 44 themselves, along with the electrode layers, transistors, etc. In FIG. 4 the rearmost polarizer 34 is eliminated and is replaced by a thin polarizing layer 50 deposited on the other side of the glass 36, next to the LC layer 32. A second polarizing film 52 is deposited directly on the other side of the LC layer 32, on the next glass piece 38. This glass sandwich, containing the rear glass 36, the thin polarizing layer 50, the slit forming LC layer 32, the next glass piece 38, and the second polarizing film 52 can then collectively form the rear glass for the image forming LCD 26, which can be of conventional design with a front polarizing film 48 on the front of its frontmost glass piece 46, as shown in FIG. 3, or an additional polarizing film deposited on back of its front glass 46, next to the LC layer 44 as shown in FIG. 4. FIG. 5 also eliminates a piece of glass, but uses front and rear polarizing sheets 48 and 34, and employs a thin deposited polarizing layer 56 behind the slit forming LC layer 32.

Figure 6:
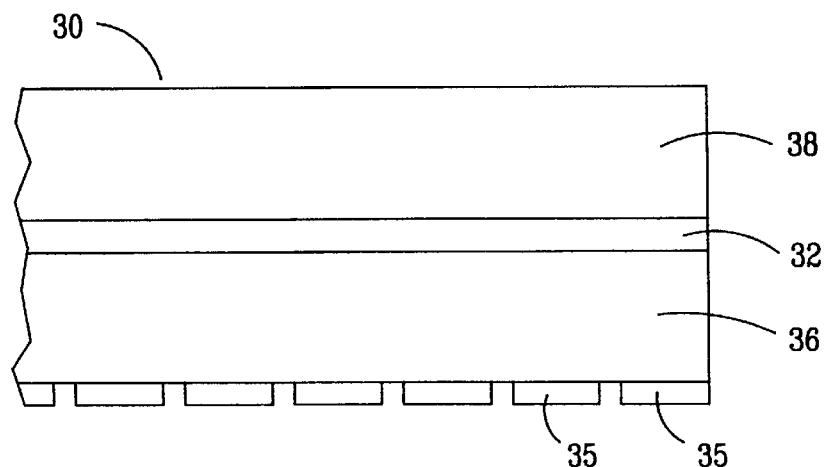
FIG. 6 shows a partial top view of an alternate embodiment of a secondary LCD.

There is another possible configuration for the secondary LCD 30 itself, as shown in FIG. 6, that is potentially thinner, simpler, and less expensive. This variation uses a series of polarizing strips 35, with clear spaces in between as shown, placed on the back side of a piece of glass 36, with the polarization direction of the strips 35 parallel to the polarization direction of the rear polarizer 40 of the image forming LCD 26. A second glass layer 38 is placed in front of the first 36, and an LC layer 32 is sandwiched between them. No polarizer needs to be placed on the front of this second piece of glass 38. The position of the molecules in the liquid crystal layer 32 can be changed by applying a voltage across the whole layer 32. In one condition, preferably the off state, the LC layer 32 lets the light pass through in such a way that the direction of polarization of light passing through the strips 35 is parallel to the direction of polarization of the rear polarizer 40 of the image forming LCD 26. It therefore passes through them without interruption, and no light lines are formed behind the image forming LCD 26, and 2D images can be viewed. When charge is applied across the secondary LCD's LC layer 32, the molecules are re-oriented to cause the polarization direction of the light to turn, so that the polarization direction of light passing through the strips 35 is now perpendicular to the polarization direction of the strips 35 on the rear glass 36. The strips 35 thus appear opaque, while the area between them remains clear, forming light lines in between the strips 35. The light lines and pixels of the image forming LCD 26 form viewing zones as usual, and 3D images can be seen.

Since no electronic structures are needed on the surfaces next to the LC layer 32, very simple construction is involved. Potentially very thin glass or even plastic sheets can be used. This in turn allows the slits to be placed very close to the image forming LC layer 44, allowing its use on smaller LCD's without a lenticular lens 24 present, and or allowing the viewing zones to be formed closer to the image LCD 26.

Barrier Mask

Figure 7:
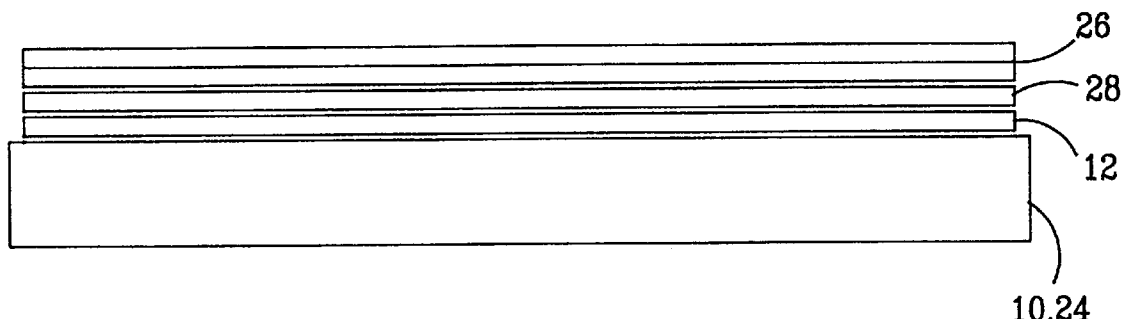
FIG. 7 shows a top view of an alternate embodiment of a display for 2D/3D viewing.

Another variation for 2D/3D imaging is possible by using the barrier mask discussed briefly above. As illustrated in FIG. 7, it is possible to use a simple barrier 12 with opaque black strips and clear transparent spaces in between. The transparent spaces form slits through which light can pass. This barrier 12 can be placed in front of a light guide 10 and lenticular lens 24 arrangement as in FIG. 2, at the same position as the LC layer 32 of the secondary LCD 30 was in FIG. 2, so that the transparent slits are coincident with the light line positions. Alternatively, this barrier 12 can simply be placed in front of a conventional diffuse backlight, as may be done when testing LCD's for 3D imaging properties. In the former case the slits of the barrier 12 simply let the light focused by the lenticular lens 24 into light lines to pass through. In the latter case they block the diffuse light everywhere except at the clear slits, where it is allowed to pass through. In this case the barrier 12 itself forms the light lines.

A layer 28 of PDLC material, or a layer of some other substance that can be changed from transparent to translucent and back at the command of the observer or by software, is placed between the barrier 12 and the LCD 26. When the PDLC material 28 is clear, the lines are visible, allowing autostereoscopic 3D viewing. When it is translucent, the lines are washed out, and diffused into even illumination which allows each eye to see all the pixels of the LCD 26 for 2D imaging. The PDLC material 28 can typically be placed very close to the barrier mask 12. In general, a distance of less than 0.5 mm will be sufficient for the material 28 to completely diffuse out the light lines when it is in the translucent condition.

The advantage of this arrangement is that in many cases it will take up less space than the variations where a liquid crystal device 30 is used to form the slits because the barrier mask 12 can be made on thin (e.g. 0.1 to 0.2 mm thick) photographic film sheets and the electronically variable 2D/3D diffuser 28 can be made of thin plastic sheets with a total thickness of about 0.8 mm. In addition to allowing a thinner display, it also allows the light lines to be placed closer to the imaging LCD's pixels 26, which allows the viewing zones to be formed closer in the display.

Windows Within Windows of Varying Dimensional Characteristics

Figure 8:
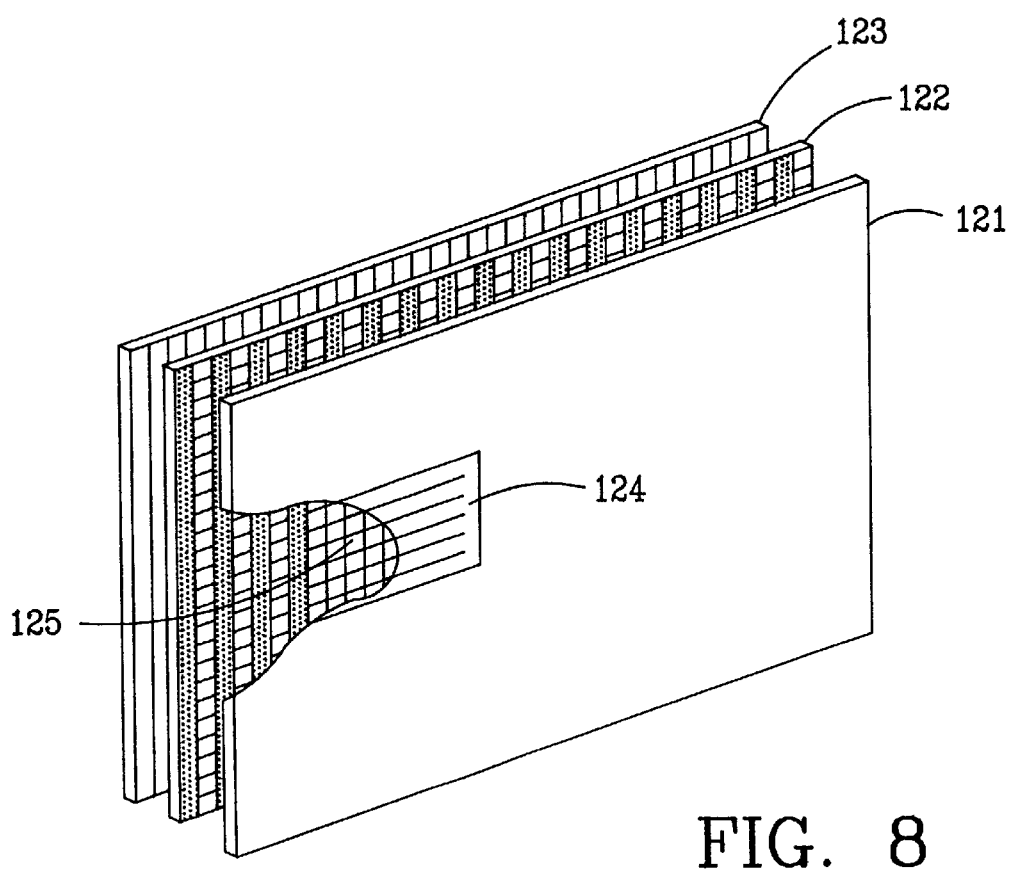
FIG. 8 shows a front perspective view of a display which can display a 2D viewing window within a 3D screen.

Turning now to FIG. 8, an embodiment which allows more versatile 2D/3D operation is shown. This embodiment is particularly useful when using a computer operating system employing windows to display different sets of information. One can drag a window and size it to cover an area for displaying a 3D image in the window while the rest of the display shows a full resolution 2D image or 2D field of text, data, symbols, and the like.

FIG. 8 shows the use of a high contrast LCD, although other light valve could be used, between a light line forming system, e.g. reflector plate light lines, and a second, image forming LCD. In this system, an extra pair of light lines 123 is generated, one behind each column of pixels on a image generating LCD 121. An extra LCD (or other type of light valve) 122, of the same resolution (total pixel count) in the horizontal direction as the image forming LCD, is placed between the light lines and the image forming LCD. For 2D viewing, every other pixel column of the valving LCD is made opaque, with the ones in between being transparent. Thus, every other light line is visible, and the observer sees 3D. When a 2D window 124 is displayed, all of the pixels within a rectangular area 125 on the light valve LCD directly behind the window 124 are made transparent, thus allowing both sets of lines to become visible. Thus, a light line is visible to both eyes behind all pixel columns within area 125, and a full resolution 2D image is seen.

All of the secondary LCD variations described above with respect to FIGS. 3–5 can alternately make use of a pattern of opaque areas between slits that can be addressed in row and column fashion, allowing individual sections of areas of the opaque stripes to become clear. If all the opaque stripes within a subspatial rectangular area of the secondary LCD become clear, for example, one can create a 2D imaging area within a larger 3D imaging area. If a Windows '95 window with a 2D image within it were placed over this area, it would be possible to display the 2D full resolution image within a 3D background image.

The opposite is also true: the opaque stripes within a given rectangular area within the secondary LCD can remain opaque, while the stripes outside that area are turned clear, creating a 3D imaging area with light lines within the rectangle, and creating a 2D imaging area without light lines, within which only even, diffuse illumination is visible, outside the rectangle. By placing a Windows '95 window or similar window containing an interleaved stereoscopic image pair over the rectangular 3D image area, and leaving a 2D background image within the rest of the image area, a 3D image will be seen within a window within a larger 2D background image.

The secondary LCD variation shown in FIG. 6 could also be used for viewing a 3D window within a larger 2D window or a 2D window within a larger 3D window. The pixels of the liquid crystal layer 32 can be individually controllable, such that charge can be applied to only a selected set of pixels within a window, rather than by applying a voltage across the whole layer as previously described. When charge is applied to the selected set of pixels within a window, the molecules of the liquid crystal layer 32 are re-orientated to cause the polarization direction of the light to turn within that window, so that the polarization direction of light passing through the strips 35 is perpendicular to the polarization direction of the strips 35 on the rear glass 36. The strips 35 thus appear opaque within the window, while the area between the strips 35 within the window remain clear, forming light lines in between the strips 35. The light lines and pixels of the image forming LCD 26 form viewing zones as usual, and 3D images can be seen within the window. Outside of the window, the unselected pixels in the liquid crystal layer 32 let the light pass through in such a way that the direction of polarization of light passing through the strips is parallel to the direction of polarization of the rear polarizer 40 of the image forming LCD 26. It therefore passes through them without interruption, and no light lines are formed behind the image forming LCD and 2D images can be viewed outside the selected window. Alternatively, of course, the pixels outside a selected window could be charged so that 2D images can be viewed in the selected window while 3D images are made visible outside the selected window.

In yet another alternate embodiment, the barrier mask 12 and PDLC layer 28 shown in FIG. 7 could also be used for viewing a 3D window within a larger 2D window or a 2D window within a larger 3D window. The PDLC layer 28 as shown and described with respect to FIG. 7 may be a single element variable diffuser. The layer 28 for use in viewing 3D windows within 2D windows and vice versa, however, has several independently controllable sections, with each section capable of becoming diffuse or transparent independently of the others. Any number of sections from two to several thousand could be present, although employing a layer 28 with a relatively large number of sections will allow a viewer a greater range of window selections. The sections could be of different sizes and shapes, although a rectangular or square shape would generally be the most useful. The layer 28 is still made from a liquid crystal material chosen to scatter light or not scatter light when an electrical voltage is applied across the liquid crystal material. Electronically, however, the diffuser would operate and be addressed in the same general manner as an image forming LCD would be, with each section being, in effect, a pixel. By causing different sections, or group of sections, in the layer 28 to become transparent while others remain diffuse, one can cause a selected window of the display to display 3-D images while the remainder of the display can display 2D images, or vice versa.

Figure 9:
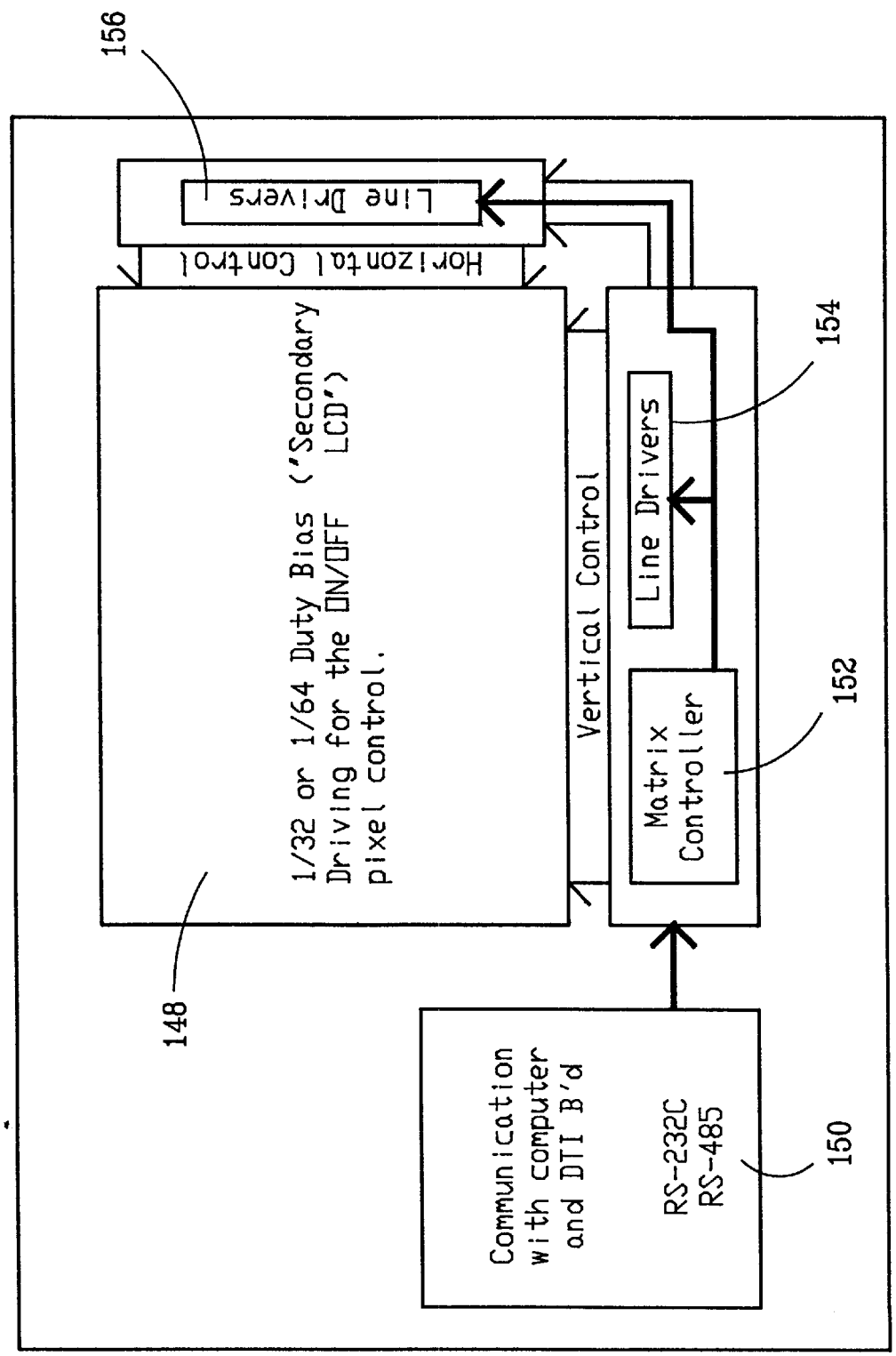
FIG. 9 shows a block diagram of a system used for 2D/3D window generation.

2D/3D window generation capability is accomplished by means of the type of system shown in FIG. 9. Windows 95 or similar operating system software runs on a computer. The software in combination with a computer interface generates signals that cause a window containing an image to be generated on an LCD display screen.

Software also generates or retrieves from memory at least three images: a background two dimensional image which will be displayed outside the window, and two images, the left and right images of a stereoscopic pair, which are to be displayed within the window. These images are stored in and read from display memory as is normally the case with computer generated images.

The secondary LCD 148 consists of a device with clear slit like vertical apertures with space in between that can be caused to become opaque or transparent. The controllable sections between the slits will consist of a number of independently controllable segments, each of which can be independently addressed and caused to become clear and transparent. Ideally, the number of segments along each line will be equal to the number of pixel rows on the image forming LCD in front of it; however, this is not absolutely necessary as lesser numbers can be used at the sacrifice of an illumination area that does not correspond exactly to the size of the window on the image forming LCD. In any case, the number of slits must be slightly more than one half the number of pixel columns on the LCD, in order for the device to show 3D images (using slightly more slits, with extras on either side of the image area, allows for off axis illumination and viewing without vignetting at the sides of the image). It may also be desirable for the controllable dark areas to be split in two vertically, creating two columns of segments within each vertical area. This would make the number of columns of independently controlled segments equal to slightly more than the number of columns of pixels on the image forming LCD.

A software package provided with the system uses information from the operating system software to generate two sets of X and Y values representing the locations of the comers of the window in terms of the rows and columns of pixels on the secondary LCD 148. This information is sent via the standard RS232 or equivalent port 150 to an FPGA controller 152 which translates this information to addressing signals to the secondary LCD drivers 154, 156, causing the drivers 154, 156 to make the secondary LCD 148 go clear everywhere except within the region directly behind the area on the screen where the window containing the 3D image will appear. In essence, one would be creating an image of a black rectangle using the addressable pixels within the areas between the slit lines of the secondary LCD 148. The FPGA controller 152 can be a standard "off the shelf" item of the type designed to control low resolution, black and white LCD's. Some of such FPGA's 152 could be programmed to take the two X, Y values and translate them into signals that cause the areas between the light line slits in the secondary LCD 148 to become dark within the rectangular area defined by the coordinates. Within the rectangular region, the secondary LCD 148 displays light lines with which viewing zones are produced. The two images of the stereo image pair are interleaved on alternate columns of pixel elements on the image forming LCD within window, and displayed therein. The result is an autostereoscopic image perceived within the window.

It is also possible to cause the lined area displayed on the secondary LCD 148 to change dimensions and move in real time in response to viewer actions, such as mouse or trackball operation which cause the image window to change and move. The signals generated by the operator actions are translated by the software provided with the system to change the two X and Y values described above, which in turn cause the FPGA 152 and LCD drivers 154, 156 to reposition and/or resize the lined area on the secondary LCD 148.

It is possible to generate 2D windows in a 3D field simply by reversing the areas where the lines and clear areas are displayed. To display a 2D image in a window surrounded by a 3D image, one simply makes the secondary LCD 148 clear within the window but causes it to display lines outside the window. Which area is to be the 3D area and which is to be the 2D area is identified by another number supplied by the software, which will provide a number to the FPGA controller 152 identifying either a 3D window surrounded by a 2D image area, or vice versa.

Multiple, overlapping windows can be handled in a similar manner. In a case where more than one window is present, multiple sets of X and Y coordinates are sent to the FPGA 152 which controls the secondary LCD 148. The FPGA 152 signals the LCD drivers 154, 156 to make the LCD 148 transparent either within or outside the rectangles defined by the coordinates.

Although the above system is described with respect to a secondary LCD which has clear slit like vertical apertures with space in between that can be caused to become opaque or transparent, the system can also be adapted for use in conjunction with the other embodiments discussed in this application, such as with the barrier mask/PDLC embodiment and the strip polarizer embodiment.

Strip diffuser for Moiré Pattern reduction.

Figure 12:
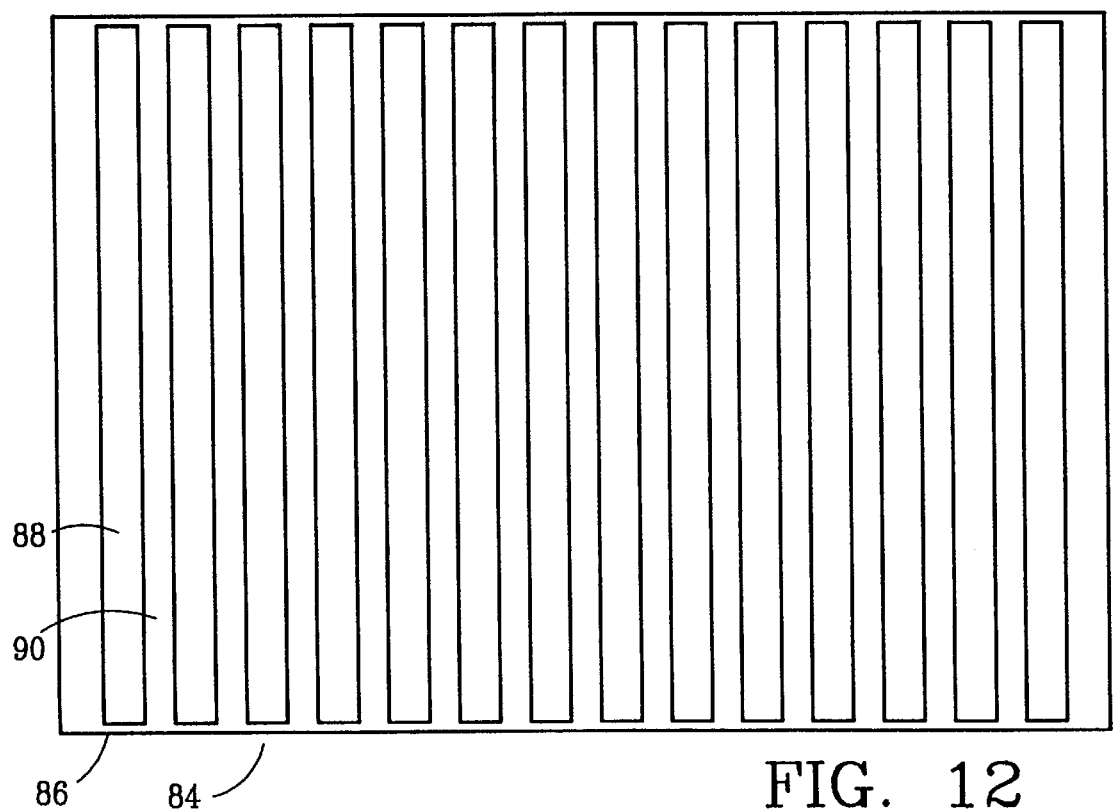
FIG. 12 shows a plan view of a strip diffuser for use in a display for the reduction of visibility of Moiré areas.
Figure 13:
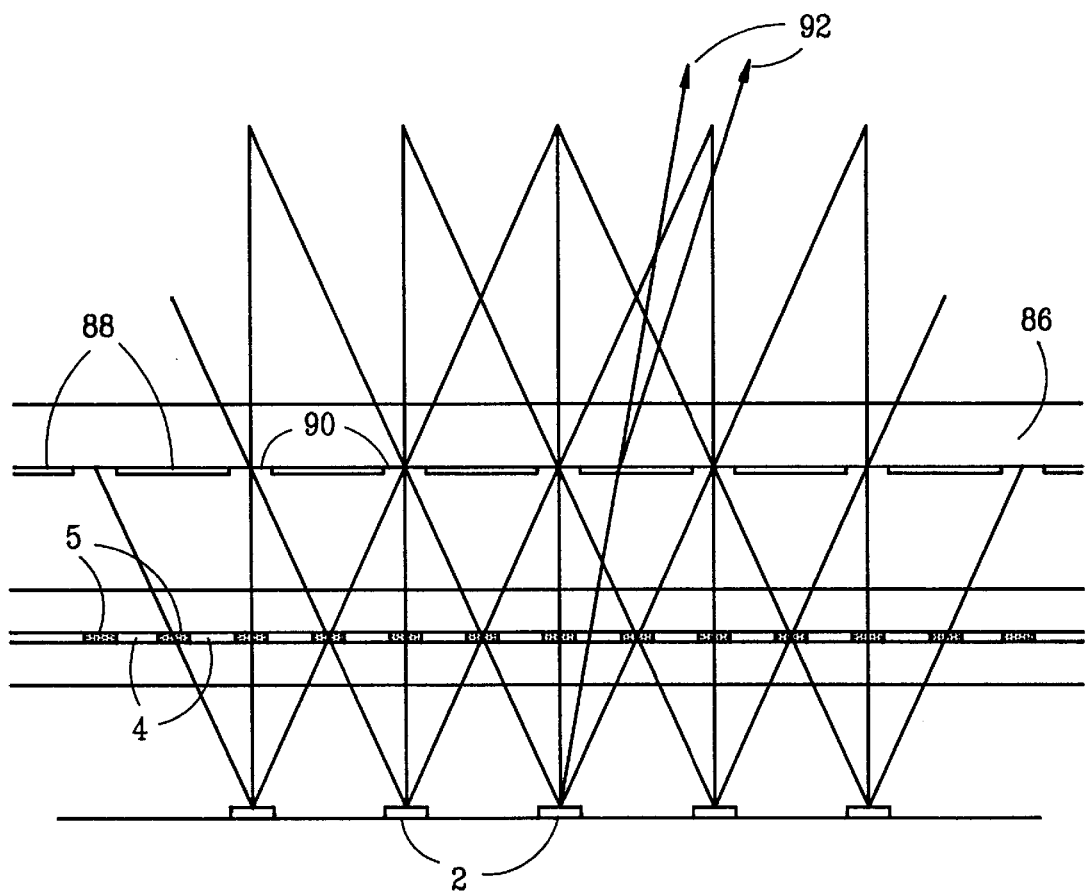
FIG. 13 shows a top view of the strip diffuser of FIG. 12 in a display.

FIGS. 12 and 13 show a feature which can be used to cause the light distribution to be more even within the 3D viewing zones and thus reduce the visibility of Moiré patterns when one gets outside the ideal viewing location.

Figure 10C:
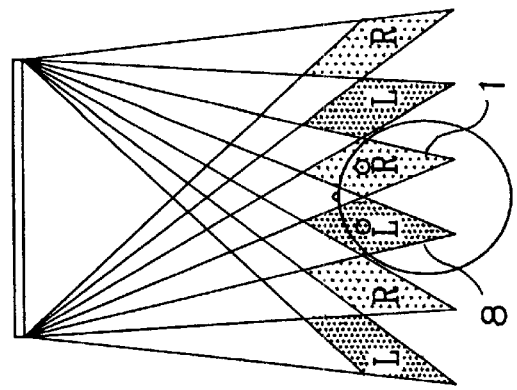
FIGS. 10A–10C show top views of how viewing zones are created from light lines behind an LCD.
Figure 10B:
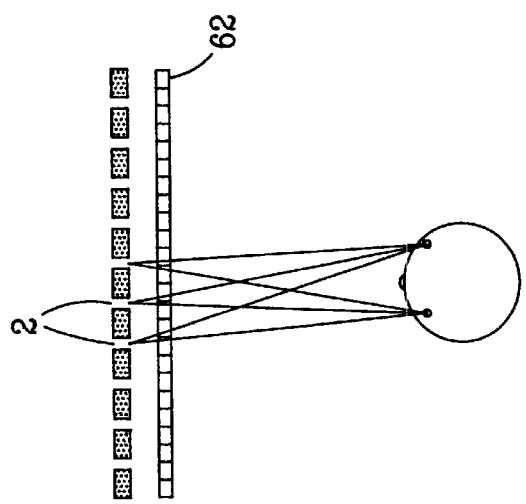
Figure 10A:
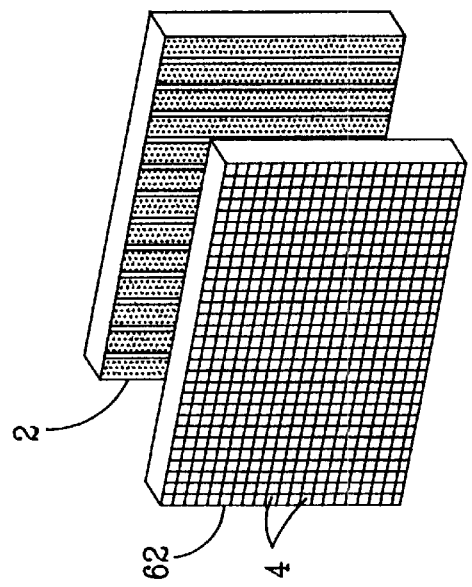
Figure 11:
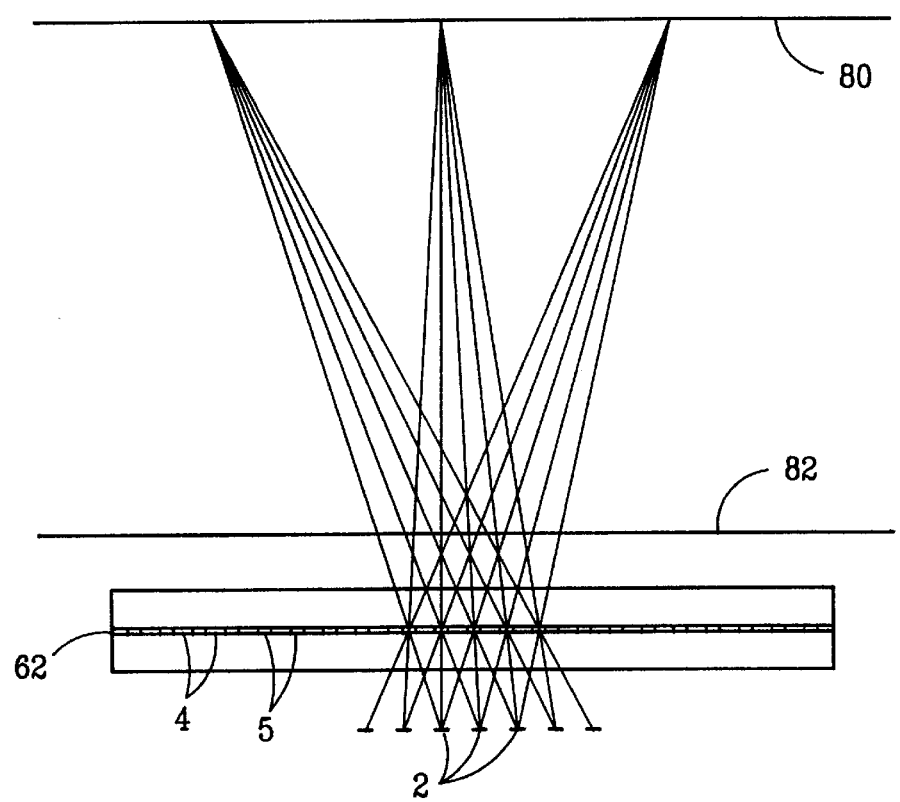
FIG. 11 shows a top view of a display, the figure demonstrating planes where lines of light cross.

As with present DTI autostereoscopic displays, light lines 2 are formed behind the pixels 4 of the LCD 62 at the proper distance and at the proper spacing for viewing zones 8 and 9 to be formed in front of the display 62, as illustrated in FIGS. 10A, 10B, and 10C. A left eye view is visible within any of the areas marked L and a right eye view is visible anywhere within one of the areas marked R in the diagram of the FIG. 10C. As seen in FIG. 11, (and has been described previously in U.S. Pat. No. 4,717,949 and in several other patents and papers) the viewing zones 8 and 9 are defined by imaginary lines starting at the light lines 2 and passing through the boundaries of the pixels 4. These sets of lines cross each other within a plane 80 that is located at a reasonable viewing distance from the display 62. The plane 80 where they cross is the plane where the viewing zones 8 and 9 are widest. If a person were to put his pupil at the point where a set of lines all cross, he would see a dark screen as the light lines 2 would seem to line up behind every other pixel boundary 5. However, there is another plane 82 where the lines also cross, which is located a short distance in front of the LCD 62 and its pixels 4. If a person were to place his or her pupil at one of the points where the lines cross in this plane 82, he or she would again see a dark screen, and would see the lines 2 behind each of the pixel boundaries 5, instead of every other one.

One can place a diffuser 84, as shown in FIG. 12, with the following configuration within this plane 82: the diffuser 84 preferably comprises a clear glass or similar substrate 86 upon one face of which exist thin vertical strips of diffusing material 88 or diffusing surface areas 88, with clear spaces 90 between them, as shown in FIG. 12. The pitch (center to center distance) of the diffusing strips 88 is equal to the pitch of the spaces between the crossed lines in 82, as defined in FIG. 11. The best width of the strips 88 depends on the relative width of the pixels 4 and the light lines 2, as well as the width of the clear areas of the pixels 4 and the width of the dark boundaries 5 between the pixels 4. In general, one should make the strips 88 wide enough to cover the area where light from the lines 2 exits the pixels 4, but narrow enough to stay outside the dark areas where light is blacked by the pixel boundaries 5. In most instances, the strip widths will wind up being between ¼ and ¾ the pitch of the strips 88. The substrate 86 with the strips is mounted in front of the LCD 62 so that the strips 88 are located in the plane 82 and lined up between the points where the lines between the centers of the light lines 2 and the centers of the pixel boundaries 5 cross, as shown in FIG. 13. The substrate 86 is aligned so that the strips 88 are vertical and parallel to the pixel columns of the LCD 62.

The diffusion characteristics of the strips 88 are chosen so that light 92 hitting the diffuser 84 is spread out just enough to enter the dark Moiré areas within the viewing plane 80 and fill these areas with light, ideally without going beyond the lines defined by the light lines 2 and pixel columns, as shown in FIG. 13. Ideally the strips 88 should be holographic diffusers with a very well defined scattering pattern, to ensure that this is the case. Typically, light would be scattered less than 2 degrees, so these would be very weak diffusers. Such weak diffusers will not adversely effect the visibility of the pixels, they will only blur them at the edges.

2D/3D Switchable Illumination Using a Movable Element

Figure 14:
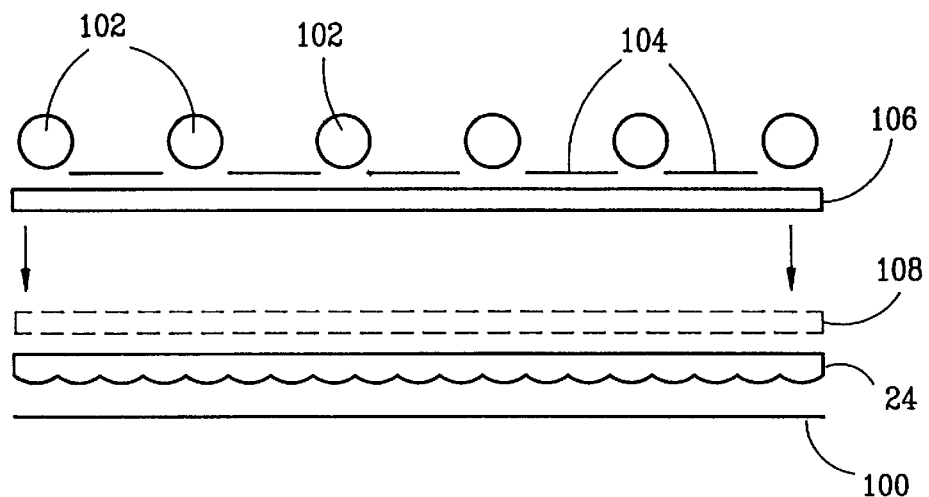
FIG. 14 shows a top view of a 2D/3D display which utilizes a movable diffuser to alternate between 2D and 3D viewing.

In an illumination system shown in FIG. 14 designed to produce a multitude of thin bright lines on a plane 100, using multiple straight lamps 102 and a lenticular lens sheet 24, and an opaque, usually black stray light barrier 104 occupying the spaces between the lamps 102, a diffuser 106 can be placed against or near the lamps when light lines are to be produced for 3D autostereoscopic applications. To provide even 2D illumination, the diffuser 106 can be moved to position 108, closer to or against the lenticular lens sheet 24. Because a display is likely to be used more for 2D applications than 3D applications, the diffuser 106 is preferably biased in the 2D position. However, it is possible that the diffuser 106 could be biased in the 3D position if it is determined that 3D applications will be run more on the display than 2D applications. Although any mechanical means could be used to move the diffuser 106 from the 2D position to the 3D position and back again to the 2D position, one preferred embodiment for enacting the movement would be to utilize magnetic coils which could be turned on for movement to one position and turned off for movement back to the biased position.

It is, of course, also possible to move the lamps 102 back away from the diffuser 106. In some configurations, the diffuser 106 may be placed at the plane where the light lines are imaged by the lenticular lens 24 (i.e., reversing the positions of diffuser 106 and lens 24 shown in FIG. 14). In such configurations it is possible to switch between light line illumination for 3D and even diffuse illumination for 2D by moving the diffuser 106 out of the plane where the light lines are formed. In practice this is usually best accomplished by moving the diffuser 106 backward so that it is close to the lenticular lens 24 and intercepts light before it is focused into light lines. It is also, of course, possible to move the lenticular lens 24 backward or forward relative to the diffuser 106, or to move the lenticular lens 24 and lamps 102 or the lenticular lens 24 and a light guide 10 together. The only requirement is that the plane where the light lines are focused is moved sufficiently far from the diffuser 106 that light is cast evenly across the diffuser 106, allowing both eyes to see light coming through all the pixels for even illumination of full resolution 2D images.

Thus, it is apparent that there has been provided, in accordance with the invention, a display that fully satisfies the objects and advantages set forth above. While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A 2D/3D display, comprising:
   an image forming LCD;
   a secondary LCD; and
   an electronic control, connected to the secondary LCD to selectively provide the secondary LCD to be clear when the display is in 2D mode and the secondary LCD to exhibit dark opaque stripes when the display is in 3D mode.

2. A 2D/3D display comprising:

an image forming LCD; and, a secondary LCD being clear in 2D mode, and displaying thin transparent lines separated by dark opaque stripes in 3D mode;

a light line forming device, the transparent lines of the secondary LCD being coincident with light lines from the light line forming device, wherein the dark opaque stripes of the secondary LCD block stray light that can cause ghost images.

3. The 2D/3D display of claim 1 wherein the secondary LCD comprises a light line forming liquid crystal layer.

4. The 2D/3D display of claim 1 wherein the secondary LCD further comprises a front layer of glass and a rear layer of glass sandwiching the liquid crystal layer therebetween.

5. The 2D/3D display of claim 4 wherein the image forming LCD comprises a rear layer of glass and a front layer of glass divided by an image forming liquid crystal layer.

6. The 2D/3D display of claim 5 wherein the image forming LCD further comprises a front polarizer on the front layer of glass and a rear polarizer on the rear layer of glass.

7. A 2D/3D display comprising:

an image forming LCD; and, a secondary LCD being clear in 2D mode, and displaying thin transparent lines separated by dark opaque stripes in 3D mode, the secondary LCD comprising a liquid crystal layer and a series of polarizing strips having clear spaces in between the polarizing strips.

8. The 2D/3D display of claim 7 wherein the liquid crystal layer and the polarizing strips are separated by a layer of glass.

9. The 2D/3D display of claim 7 wherein a position of molecules within the liquid crystal layer can be changed, upon application of a voltage, to be perpendicular to a polarization direction of the polarizing strips.

10. The 2D/3D display of claim 9 wherein the image forming LCD comprises a rear polarizer and wherein a polarization direction of the polarization strips is parallel with a polarization direction of the rear polarizer, such that the polarization strips appear opaque upon application of the voltage, forming the dark opaque stripes for 3D mode.

11. The 2D/3D display of claim 7 wherein the image forming LCD comprises a rear polarizer and wherein a polarization direction of the polarization strips is parallel with a polarization direction of the rear polarizer.

12. The 2D/3D display of claim 1, in which the secondary LCD comprises a plurality of individually addressable sections and the electronic control comprises a plurality of outputs for independently addressing the sections for selectively switching the sections between 2D and 3D modes.

13. The 2D/3D display of claim 12, wherein the electronic control produces a signal that causes the controllable sections outside a defined area to remain dark for 3D mode, and another signal that causes the controllable sections within the defined area to turn clear for 2D mode.

14. The 2D/3D display of claim 12, wherein the electronic control produces a signal that causes the controllable sections within a defined area to remain dark for 3D mode, and another signal that causes the controllable sections outside the defined area to turn clear for 2D mode.

15. A 2D/3D display comprising:

an image forming LCD; and, a secondary LCD being clear in 2D mode, and displaying thin transparent lines separated by dark opaque stripes in 3D mode, at least some of the dark opaque stripes having individually controllable sections, wherein a 3D imaging area can be viewed within a larger 2D imaging area by turning the controllable sections of the opaque stripes outside a subspatial defined area on the secondary LCD clear while the opaque stripes within the defined area remain dark;

software for generating coordinates of a boundary of a defined area.

16. The 2D/3D display of claim 15 comprising a controller for translating information from the software, and comprising line drivers for receiving signals from the controller to make the secondary LCD go clear everywhere except within the defined area.

17. The 2D/3D display of claim 14 wherein the secondary LCD comprises a light line forming liquid crystal layer, the dark opaque stripes being formed by the liquid crystal layer.

18. The 2D/3D display of claim 14 wherein the secondary LCD comprises a liquid crystal layer and a series of polarizing strips having clear spaces in between the polarizing strips.

19. The 2D/3D display of claim 18 wherein a position of molecules within the liquid crystal layer can be changed, upon application of a voltage, to be perpendicular to a polarization direction of the polarizing strips, the image forming LCD comprises a rear polarizer, a polarization direction of the polarization strips is parallel with a polarization direction of the rear polarizer, such that the polarization strips appear opaque upon application of the voltage, forming the dark opaque stripes for 3D mode.

20. The 2D/3D display of claim 7, where the secondary LCD comprises a plurality of individually addressable sections.

21. The 2D/3D display of claim 20, further comprising an electronic control that produces a first signal that causes the controllable sections outside a defined area to remain dark for 3D mode, and a second signal that causes the controllable sections within the defined area to turn clear for 2D mode.

22. The 2D/3D display of claim 20, further comprising an electronic control that produces a first signal that causes the controllable sections within a defined area to remain dark for 3D mode, and a second signal that causes the controllable sections outside the defined area to turn clear for 2D mode.

23. The 2D/3D display of claim 1, where the electronic control applies a voltage to generate dark opaque stripes in the secondary LCD in 3D mode and zero voltage to make the secondary LCD turn clear in 2D mode.

* * * * *